3,390,999
PROTEIN-RICH FEED MATERIAL AND METHOD OF MAKING
Leif Jantzen, Oslo, Norway, assignor to Arthur C. Trask & Sons, a copartnership
No Drawing. Filed Apr. 30, 1964, Ser. No. 364,003
4 Claims. (Cl. 99—2)

ABSTRACT OF THE DISCLOSURE

A method of purifying an aqueous protein-containing liquid by adding an aqueous solution of lignosulfonic acids to said aqueous protein containing liquid to effect precipitation of combined protein-lignosulfonic acids and separating the precipitate.

---

This invention relates to a method of making a protein rich product, the method of making an animal feed containing said product and a protein enriched animal feed material.

Many industrial operations result in protein rich liquids which are treated as industrial wastes and disposed of without recovery of the protein. The methods and product of this invention provide for the recovery of this protein so that it can be used as an animal feed component to enrich the feed.

One of the features of this invention therefore is to provide an improved method of making a protein product suitable as an animal feed component.

Another feature of the invention is to provide an improved animal feed material containing enriching protein.

Other features and advantages of the invention will be apparent from the following description thereof.

The industrial waste materials, usually in the form of aqueous solutions and dispersions that contain considerable quantities of proteins that are ordinarily lost, are exemplified by stick water from the fish oil and particularly herring oil industry, waste water from potato starch plants, whey from dairies and blood and water containing blood from slaughterhouses, waste water from green animal food silos, and the like. In many of these instances, the presence of the protein impedes or prevents the recovery of other valuable products from these wastes. Thus, in whey and potato starch water the proteins must be removed before the carbohydrates can be recovered from the waste. Furthermore, the presence of the proteins in the sewage is undesirable as they tend to decompose into amino acids which make the waste quite offensive.

In the method of this invention these proteins are recovered in the form of combined protein-lignosulfonic acids so that this combined form can be used as an animal feed component to enrich the feed with the protein. Thus, the protein containing waste waters can be treated with waste sulfite liquor as it comes from the digesters of the paper mill. When this waste sulfite liquor is mixed with the aqueous waste containing the proteins, there is a precipitate formed of protein-lignosulfonic acids in combined form.

Although the waste sulfite liquor can be used without previous treatment as it is tapped from the pulp mill digesters, this liquor can be further treated to separate out the alpha-lignosulfonic acids as the other lignosulfonic acids do not take part in the precipitation. A method for separating out these alpha acids is disclosed in my prior U.S. Patent No. 2,838,483.

The waste sulfite liquor from the digesters ordinarily contains approximately 40% alpha-lignosulfonic acids. It is these acids that form the precipitate with the protein. When the waste liquor or the separated alpha acids are mixed with the aqueous waste containing the protein the alpha-lignosulfonic acids and the protein combine in the proportions of 40 weight parts of acid to 100 weight parts of protein to give 140 parts of lignoprotein (protein and alpha-lignosulfonic acids in combined form). The percentage proportion is about 28 weight percent of lignosulfonic acids and about 72 weight percent of edible proteins.

Because of the presence of sulfur dioxide many countries limit the amount of this ingredient in animal feeds to a maximum of about 3%. Because the method of this invention forms the protein and lignosulfonic acids in combined form, which then precipitates out, free sulfur dioxide and loose combined sulfur dioxide are removed. This permits the use of large quantities of lingoproteins in animal feed without exceeding the maximum 3% of sulfur dioxide. Thus, the lignoprotein of this invention may be used in animal feeds up to about 12%, and this will introduce only the maximum 3% sulfur dioxide into the feed.

The lignoprotein prepared according to this invention not only enriches the animal feed when mixed with feedstuffs, but it also can serve as a binder to make animal feed pellets by usual pelletizing processes. One such process is described in U.S. Patent 3,035,920 of May 22, 1962.

If desired, the protein-lignosulfonic acids are usually mixed with other protein containing materials such as fish meal, casein and the like before being mixed with the feedstuffs to make the protein enriched feed. Even in these mixtures the lignoprotein of this invention serves as a binder if pelletizing is desired.

The protein-lignosulfonic acids after being precipitated as described above may be easily separated from the liquid medium by filtration. This protein rich material may be rendered soluble by mixing with aqueous alkali solutions such as aqueous ammonia of a pH of about 5. The resulting solution may be dried in the usual manner as by spray driers and the resulting dry powder is easily dissolved in water. Furthermore, it is non-hygroscopic when so dried.

As described earlier, the waste sulfite liquor as it comes from the paper mills may be used to precipitate the protein from liquid protein containing industrial wastes. Also, if desired, the alpha-lignosulfonic acids may be first separated out and used in the precipitation as previously described. In addition, the waste sulfite liquor may be treated to remove the sugar as by torula fermentation. Such a sugar free sulfite liquor will have the alpha-lignonsulfonic acids increased to about 60% by weight. The torula yeast which removes the sugar in the customary and well known manner may be left in the liquor, if desired, so that the total protein content of the protein-lignosulfonic acids will be further increased because of the presence of this yeast.

In fact, the yeast itself may be used as a source of protein to combine with the lignosulfonic acids and form the product of this invention. Thus, a usual waste sulfite liquor containing 25% sugar will produce a torula yeast content of about 12.5 weight percent having a protein content of about 50%. This torula yeast fermented waste sulfite liquor can be evaporated and spray dried into a powder consisting mainly of protein and lignosulfonic acids with an edible protein content of about 6–10%. This protein content is of course increased if the torula fermented waste sulfite liquor is used as a precipitant for the protein of liquid protein-containing industrial waste as described herein.

The following examples illustrate the invention.

EXAMPLE 1

Stick water from the production of herring oil having a solids content of about 10% is treated with sufficient alpha-lignosulfonic acids to precipitate the protein present. This precipitate contains about 72 weight percent protein and about 28 weight percent lignosulfonic acids. This precipitate may be easily separated by filtration and compressed to a water content of about 40%. The vitamins B from the stick water are also precipitated with the protein to enrich the precipitate. The ligno-protein precipitate thus produced may be added to fish meal as an additive feed mixture up to about 12 weight percent.

EXAMPLE 2

Milk whey containing about 1% protein was treated with alpha-lignosulfonic acids to form a precipitate containing the acids and the ligno casein from the whey in combined form. The yield of this precipitate was about 1.4 weight part per each weight part of protein in the whey. This precipitate was then mixed in an amount of about 10% with an animal feedstuff mixture of about 186 parts of ground yellow corn, 2 parts of dried calcium phosphate, 1 part of ground limestone, 2 parts of salt and 5 parts of soybean oil meal to produce a cattle diet formula.

EXAMPLE 3

Waste water from potato starch production containing about 1% protein and about 4% starch was treated with 0.4% alpha-lignosulfonic acids. The protein was precipitated in combined form with the alpha acids and was mixed with a standard animal feed material in an amount of about 12%.

The protein-lignosulfonic acids product of this invention may use as a source for the lignosulfonic acids waste liquors derived from the digestion of plant products such as wood, straw, cereal grains and the like, all as well understood in the art. Furthermore, the liquor may be used as such or the alpha-lignosulfonic acids may be separated and used to precipitate the protein. The resulting product in any case is a valuable animal feed component when mixed with any standard feed mixture for feeding pets, livestock and other animals. These animal feedstuffs usually contain ground grain, soybean cake oil meal, vitamins, molasses, meat scraps and the like as well understood by those skilled in the art.

The protein product of this invention is ideally suited for making animal feed pellets in the customary and well known manner. Its advantages as a pelletizing material is not only due to its high protein content but also because it has good binding properties and is non-hygroscopic. Thus, waste sulfite liquor itself has been proposed as a binding material in making pellets, but it has the disadvantages of having a relatively high sulfur dioxide content, having little food value and is hygroscopic, with the result that the pellets tend to stick together and form large lumps. Pellets made with the protein-lignosulfonic acids product of this invention are non-hygroscopic and have important added food value.

Having described my invention as related to the embodiments set out herein, it is my intention that the invention be not limited by any of the details of description, unless otherwise specified, but rather be construed broadly within its spirit and scope as set out in the accompanying claims.

I claim:

1. The method of purifying an aqueous liquid that contains protein and producing a protein product suitable as an animal feed component, consisting of: adding an aqueous solution of lignosulfonic acids to said aqueous liquid containing protein to precipitate protein-lignosulfonic acids in combined form; and separating out said precipitate from said liquid.

2. The method of purifying an aqueous liquid that contains protein and producing a protein product suitable as an animal feed component, comprising: adding a substantially sugar free aqueous solution of alpha-lignosulfonic acids to said aqueous liquid containing protein to precipitate protein-alpha-lignosulfonic acids in combined form; and separating out said precipitate from said liquid.

3. The method of purifying an aqueous liquid that contains protein and producing a protein enriched animal feed, consisting of: adding an aqueous solution of lignosulfonic acids to said aqueous liquid containing protein to precipitate protein-lignosulfonic acids in combined form; separating out said precipitate from said liquid; and mixing said precipitate with animal feed.

4. The method of purifying an aqueous liquid that contains protein and producing a protein enriched animal feed, comprising: adding a substantially sugar free aqueous solution of lignosulfonic acids to said aqueous liquid containing protein to precipitate protein-lignosulfonic acids in combined form; separating out said precipitate from said liquid; mixing said precipitate with animal feed; and forming said mixture into pellets.

References Cited

UNITED STATES PATENTS 2,418,311   4/1947   McFarlane et al. _____ 99—2

HYMAN LORD, Primary Examiner.

A. LOUIS MONACELL, Examiner.

J. M. HUNTER, Assistant Examiner.